INVENTOR.
Clifford C. Wetzel

INVENTOR.
Clifford C. Wetzel
BY
Learman, Learman & McCulloch
ATTORNEYS

United States Patent Office 3,285,306
Patented Nov. 15, 1966

3,285,306
VEGETABLE TOPPING MACHINE
Clifford C. Wetzel, Rte. 1, Ithaca, Mich.
Filed Oct. 28, 1963, Ser. No. 319,308
9 Claims. (Cl. 146—83)

This invention relates to vegetable topping apparatus and more particularly to apparatus for severing the tops from onions or other vegetables having tops, the apparatus being applicable either in the field or at some permanent location.

In the harvesting of onions and other crops having tops, it is common practice to sever the tops from the vegetables prior to packaging the vegetables for sale. In some instances it is desirable to sever the tops in the field and to leave the tops on the ground, whereas in other instances it is desirable to sever the tops from the vegetables in such manner as to avoid depositing the tops on the ground. In either event, the onions or other vegetables may be conveyed along a path leading to and beyond a tops cutting zone at which the vegetables are erected to position them with their tops uppermost before presentation to a cutting mechanism which severs the tops from the vegetables. The severed tops then preferably are entrained in an air stream and blown away while the severed vegetables are collected in a bin or other container.

An object of the invention is to provide apparatus particularly adapted for use in severing tops from vegetables and which includes means for positioning the vegetable tops in the most efficient location for severing from the vegetables.

Another object of the invention is to provide apparatus of the character referred to and which includes adjustable mechanism for controlling the positioning of the vegetable tops.

A further object of the invention is to provide apparatus of the class described that is adaptable for use in either mobile or stationary installations.

Figure 1:
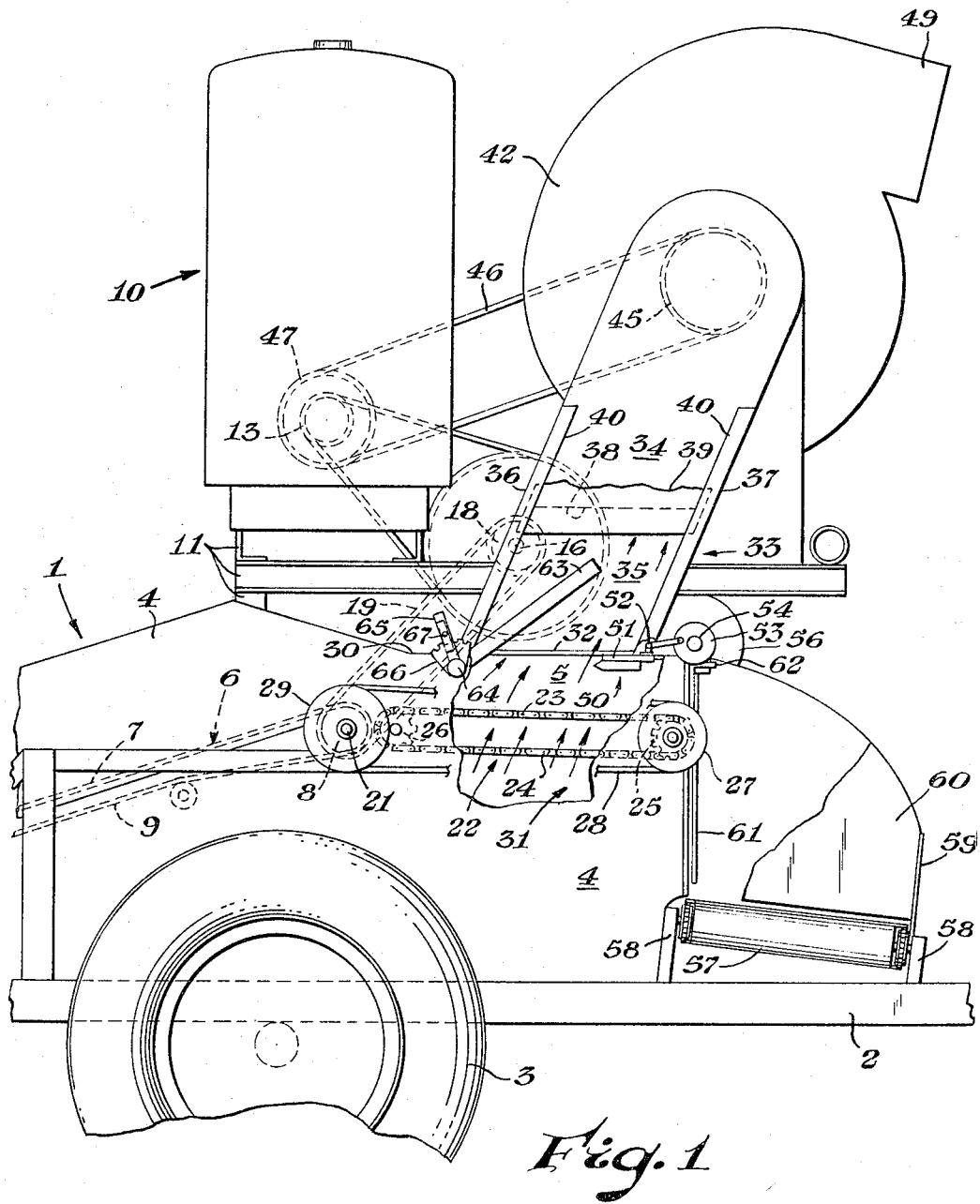
Figure 2:
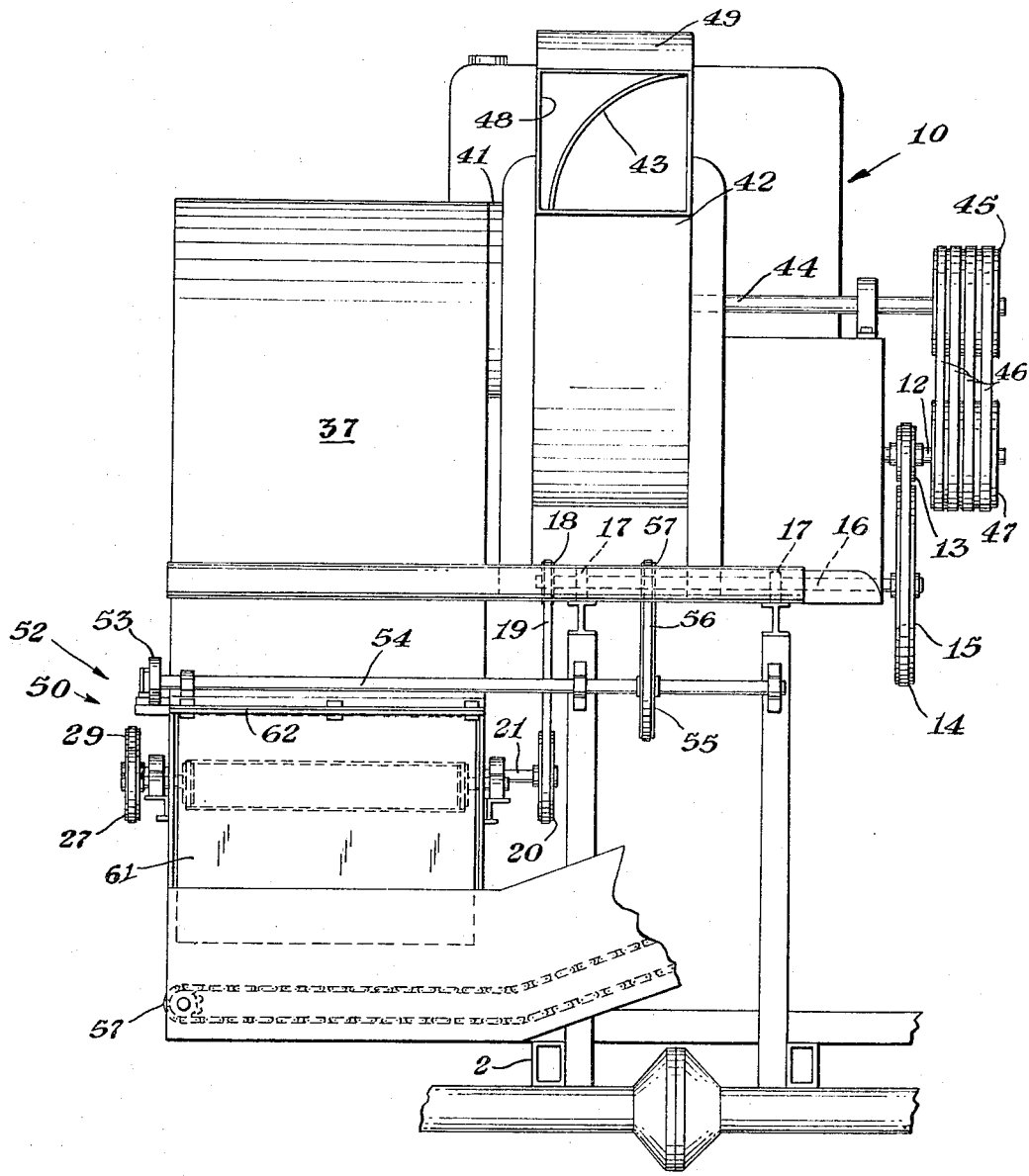

Other objects and advantages of the invention will be pointed out specifically or will become apparent from the following description when it is considered in conjunction with the appended claims and the accompanying drawings, in which:

FIGURE 1 is a fragmentary, side elevational view of apparatus constructed in accordance with the invention; and FIGURE 2 is a fragmentary, rear elevational view of the apparatus shown in FIGURE 1.

Apparatus constructed in accordance with the invention is disclosed as being incorporated in a mobile vehicle V having a frame or chassis 2 on which is journaled a number of ground engaging wheels 3. The forward end of the chassis may be provided with a hitch (not shown) for connecting the vehicle to a tractor or the like so as to permit it to be drawn through a field of growing vegetables.

Supported on the chassis is a pair of spaced apart side walls 4 and 5 between which extends an endless, lattice-like open or perforate conveyor 6. The conveyor 6 has an upper run 7 that is inclined upwardly and rearwardly of the vehicle and, at its rearward end, is trained around a driving drum 8 that is journaled for rotation in the side walls 4 and 5. From the driving drum 8 the lower run 9 of the conveyor extends forwardly and downwardly and is trained around a drum (not shown) located at the forward end of the frame. If desired, the forward ends of the side walls 4 and 5 may be shaped in a conventional manner to form a plow for uprooting vegetables and guiding them onto the conveyor 6. An example of this kind of construction is disclosed in Patent No. 2,553,519, granted May 15, 1951.

Means for driving the drum 8 comprises an internal combustion engine 10 mounted on frame members 11 supported on the chassis and having a driven shaft 12 to which is fixed a pulley 13. Trained around the pulley 13 is a belt 14 that also is trained around a pulley 15 which is fixed on a shaft 16 journaled in bearings 17 that are supported on the frame. Also fixed to the shaft 16 is a pulley 18 around which is trained a belt 19, the belt also being trained around a pulley 20 fast on the drum 8 so as to drive the latter. The direction of rotation of the pulley 20 is such as to cause the upper run 7 of the conveyor 6 to be driven toward the rear of the vehicle.

Rearwardly of the conveyor 6 is a second perforate conveyor 22 having substantially horizontal upper and lower runs 23 and 24, respectively. The conveyor 22 is trained about spaced apart drums 25 and 26 that are journaled for rotation between the side walls 4 and 5, and fixed to the drum 25 is a pulley 27 around which is trained a drive belt 28 that also is trained around a pulley 29 which is fixed to the shaft 21.

At their upper ends the side walls 4 and 5 are spanned by a top cover 30 which, together with the side walls, forms an open bottom chamber 31. Atop the cover 30 is an upstanding, rearwardly inclined, hollow duct or conduit 33 having side walls 34 and 35 and front and rear walls 36 and 37, respectively. The conduit 33 communicates with the chamber 31 through an inlet opening 32. The side wall 34 is provided with an opening 38 that normally is closed by a door 39 which is slideably mounted in tracks 40 supported on the wall 34.

At the upper end of the conduit 33 is an opening in which is fitted a duct 41 which communicates with the interior of a housing 42 in which is rotatably journaled a suction generating fan or blower 43. To the fan is fixed a shaft 44 on which is mounted a multiple groove sheave 45 around which is trained a plurality of drive belts 46. The belts 46 also are trained around a multiple groove sheave 47 that is fixed to the motor driven shaft 12. The fan 43 is driven in such direction as to establish an airstream that flows upwardly from below and through the conveyor 22, into the duct 33 via the inlet opening 32, into the fan housing 42 and outwardly through a discharge opening 48 formed in a tangential extension 49 of the housing 42.

A vegetable tops cutting mechanism 50 is supported in the chamber 31 above the level of the conveyor 22. The cutting mechanism 50 may comprise a sickle bar of conventional construction having a laterally reciprocable blade 51 which is reciprocated by a bell crank and link assembly 52. The link may be eccentrically mounted on a wheel 53 which is fixed to a shaft 54 journaled on the vehicle frame and having a pulley 55 around which is trained a driving belt 56, the belt 56 also being trained around a pulley 57 that is fast on the shaft 16. The sickle bar may be the same kind disclosed in the aforementioned patent and the blade reciprocating mechanism may be of the kind more fully disclosed therein.

The area of the chamber 31 above the conveyor 22 hereinafter will be referred to as the cutting zone. The cutting zone terminates at the rear end of the conveyor 22, and vegetables discharged from the upper run 23 of the conveyor are delivered to a transverse conveyor 57 which extends laterally of the vehicle and is supported by brackets 58 that are fixed to the vehicle frame. A rear wall 59 and a side wall 60 prevent vegetables from falling off the conveyor 57, and vegetables delivered to the latter may be transported by the conveyor to a receiving bin or other storage area.

At the rear of the cutting zone is a vertically suspended, imperforate sheet 61 formed of flexible material such as rubber. The sheet may be suspended from its upper edge of means of a clamping frame 62 which spans the distance between the side walls 4 and 5 and bears against the rear ends of the latter. The purpose of the flexible sheet 61 will be explained hereinafter.

In the operation of the apparatus described thus far to cut off the tops of onions, the onions having attached tops may be delivered via the conveyor 6 to the conveyor 22 for movement along a substantially horizontal path to and beyond the cutting zone. The fan 43 will be in operation so as to generate, by suction, an airstream flowing upwardly through the conveyor 22 and at such velocity as to erect the onions and position their tops uppermost. The airstream will follow the direction of the duct 33 which, as is best shown in FIGURE 1, is inclined upwardly and rearwardly of the vehicle frame. Thus, the tops of the onions will be inclined rearwardly for presentation to the cutting mechanism 50 in a position for efficient severing of the tops.

Should any appreciable amount of air be drawn into the cutting zone from the rear of the latter, the rearward inclination of the vegetable tops would be adversely affected. It is to prevent this that the flexible sheet 61 is provided, and it will be understood that vegetables from which the tops have been severed will be capable of being discharged from the conveyor 22 by displacing the sheet 61, and that such displacement of the sheet will not allow for any substantial amount of air to be drawn into the cutting zone.

Tops that have been severed from the vegetables are entrained in the air stream and are blown out of the fan housing through the discharge opening 48. The severed tops may be scattered over the field through which the vehicle is drawn or, if preferred, they may be collected as they emerge from the fan housing.

The tops of some vegetables are lighter or longer than others and, to permit the apparatus to be utilized effectively for more than one kind of vegetable, it may be necessary to provide for some adjustment in the direction and velocity of the airstream. Apparatus constructed in accordance with the invention is provided with a deflecting plate 63 which spans the distance between the walls 4 and 5 and is welded or otherwise suitably fixed to a rod 64 that is pivoted at its opposite ends in the walls 4 and 5 at the forward end of the cutting zone and substantially at the level of the inlet opening 32 of the duct 33. Fixed to the rod 64 is an operating lever 65 having a bifurcated end which straddles a toothed quadrant plate 66. A pawl 67 carried by the lever 65 may be received between any two adjacent teeth on the plate 66 to fix the plate 63 in a desired position of adjustment.

The deflector plate 63 is illustrated in FIGURE 1 is an intermediate position of adjustment, but it may be swung from a position adjacent and substantially parallel to the duct wall 36 clockwise to a position in which it substantially overlies the cutting zone and effectively restricts the size of the inlet to the duct. When the deflector 63 is in the position shown in FIGURE 1, or in a further clockwise adjusted position, air entering the duct 33 is accelerated, due to the restriction in the effective size of the inlet opening, so as to be capable of exerting a stronger force on the vegetable tops than is the case when the deflector is adjacent and parallel with the wall 36. Acceleration of the air is possible because of the positioning of the fan in such manner as to produce an airstream in the duct by suction. Consequently, it is possible to provide an airstream having differential speeds in the lower and upper portions of the cutting zone.

The disclosed embodiment is representative of a presently preferred apparatus, but is intended to be illustrative rather than definitive of the invention. The invention is defined in the claims.

I claim:

1. Apparatus for cutting off the tops of vegetables, said apparatus comprising perforate, vegetable supporting, movable conveyor means for delivering vegetables rearwardly along a path leading to and beyond a tops cutting zone; upwardly and rearwardly inclined conduit means having an inlet opening; means mounting said conduit means at said cutting zone in a position such that said inlet opening is located above said conveyor means in communication with said zone; blower means mounted in said conduit means; means connected to said blower means for driving the latter at such speed as to establish an airstream flowing upwardly from below and through said conveyor means into said inlet opening and at sufficient velocity to erect said vegetables on said conveyor means and position them with their tops uppermost; deflector means movably mounted in said conduit means adjacent the inlet opening thereof and operable to vary the size of said inlet opening and the velocity of air passing therethrough; and cutting means mounted at said cutting zone in said airstream and above said conveyor means in the path of rearward movement of the tops of said vegetables, said cutting means being operable to severe the tops from said vegetables.

2. Apparatus as set forth in claim 1 wherein said deflector means is mounted in said conduit means at the forward end of said zone.

3. Apparatus as set forth in claim 2 wherein said deflector means is mounted for pivotal movement.

4. Apparatus for cutting off the tops of vegetables, said apparatus comprising perforate, vegetable supporting, movable conveyor means for delivering vegetables rearwardly along a path leading to and beyond a top cutting zone; wall means enclosing the top and sides of said zone to form an open bottom chamber; conduit means having an inlet opening communicating with said chamber through the top thereof; blower means mounted in said conduit means; means connected to said blower means for driving the latter at such speed as to establish an airstream flowing upwardly from below and through said open conveyor means into said inlet open and at sufficient velocity to erect said vegetables on said conveyor means and position them with their tops uppermost; deflector means movably mounted in said conduit means adjacent the inlet opening thereof and operable to vary the size of said inlet opening and the velocity of air passing therethrough; cutting means mounted at said cutting zone in said airstream and above said conveyor means in the path of rearward movement of the tops of said vegetables, said cutting means being operable to sever the tops from said vegetables; and means supporting rearwardly of said conveyor means for collecting vegetables from which the tops have been severed.

5. Apparatus as set forth in claim 4 wherein said deflector means is mounted in said conduit means at the forward end of said zone.

6. Apparatus as set forth in claim 5 wherein said deflector means is mounted for pivotal movement.

7. Apparatus for cutting off the tops of vegetables, said apparatus comprising perforate, vegetable supporting, movable conveyor means for delivering vegetables rearwardly along a path leading to and beyond a tops cutting zone; wall means enclosing the top and sides of said zone to form an open bottom chamber; conduit means having an inlet opening communicating with said chamber through the top thereof; blower means mounted in said conduit means; means connected to said blower means for driving the latter at such speed as to establish an airstream flowing upwardly from below and through said conveyor means and said chamber into said inlet opening and at sufficient velocity to erect said vegetables on said conveyor means and position them with their tops uppermost; cutting means mounted in and adjacent the rear of said cutting zone in said airstream and above said conveyor means in the path of rearward movement of said tops, said cutting means being operable to sever the tops from said vegetables; and airstream deflector means pivotally mounted adjacent the forward end of said cutting zone and being swingable rearwardly from a first position substantially parallel to said airstream toward an adjusted position overlying said cutting zone and partially restricting said inlet opening to vary the velocity and direction of air passing therethrough.

8. Apparatus as set forth in claim 7 including means mounted at the rearward end of said cutting zone for collecting vegetables from which the tops have been severed.

9. Apparatus as set forth in claim 8 including flexible, imperforate sheet means interposed between said collecting means and said conveyor means and defining a rear wall of said chamber.

References Cited by the Examiner

UNITED STATES PATENTS

| | | | |
|---|---|---|---|
| 926,286 | 6/1909 | Petrie | 146—83 |
| 2,553,519 | 5/1951 | Lenz | 146—83 X |
| 2,676,632 | 4/1954 | Hook et al. | 146—47 |
| 2,750,977 | 6/1956 | Vella et al. | 146—83 |
| 3,105,533 | 10/1963 | Hensgen et al. | 146—241 |
| 3,116,772 | 1/1964 | Lamb et al. | 146—241 |
| 3,163,234 | 12/1964 | Boyer | 171—17 |

FOREIGN PATENTS 629,943   9/1949   Great Britain.

ROBERT C. RIORDON, *Primary Examiner.*

J. SPENCER OVERHOLSER, *Examiner.*

W. GRAYDON ABERCROMBIE, *Assistant Examiner.*